No. 713,937. Patented Nov. 18, 1902.
H. AUSTIN.
BRAKE MECHANISM FOR MOTOR CARS.
(Application filed Apr. 23, 1902.)
(No Model.) 2 Sheets—Sheet 2.

WITNESSES
INVENTOR

UNITED STATES PATENT OFFICE.

HERBERT AUSTIN, OF ERDINGTON, NEAR BIRMINGHAM, ENGLAND.

BRAKE MECHANISM FOR MOTOR-CARS.

SPECIFICATION forming part of Letters Patent No. 713,937, dated November 18, 1902.

Application filed April 23, 1902. Serial No. 104,408. (No model.)

*To all whom it may concern:*

Be it known that I, HERBERT AUSTIN, engineer, a subject of the King of Great Britain, residing at Erdington, near Birmingham, England, have invented certain new and useful Improvements in Brake Mechanism for Motor-Cars, of which the following is a specification.

The object of this invention is to insure that brakes used in connection with wheels at opposite sides of a motor-car and operated by a single handle or motor will be caused to press with equal, or substantially equal, pressure against their respective wheels.

The above object is accomplished according to this invention in the manner illustrated by the drawings herewith, of which—

Figure 1:
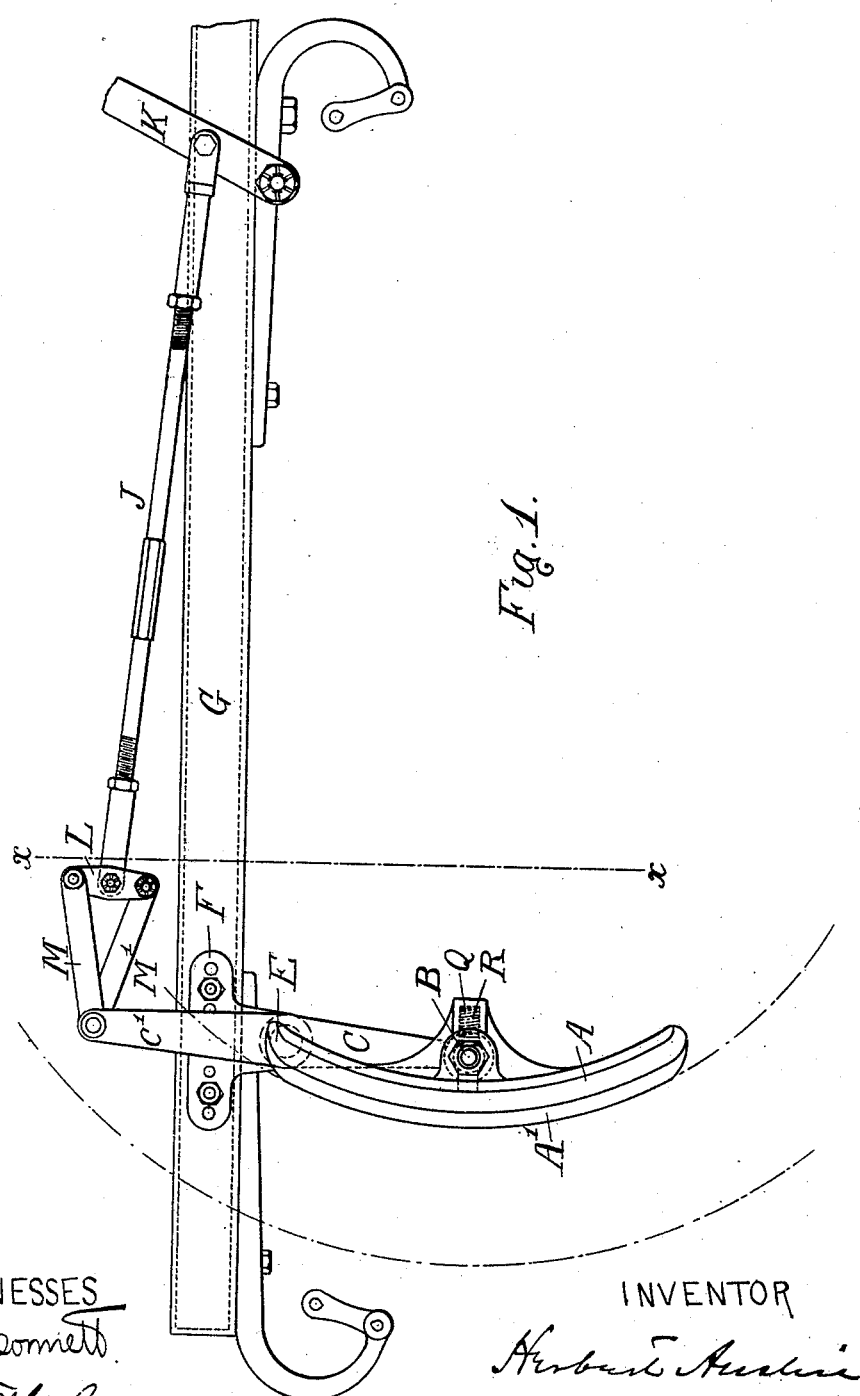
Figure 2:
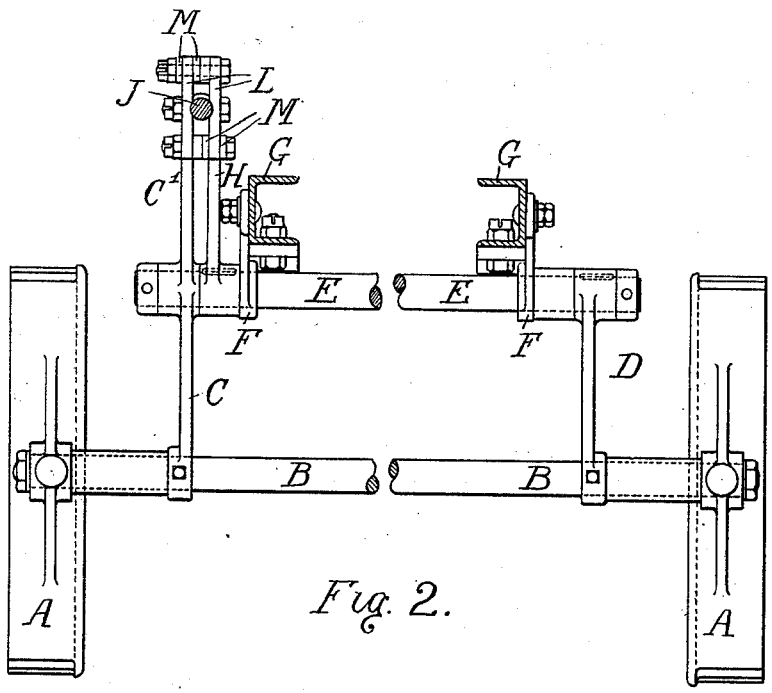
Figure 3:
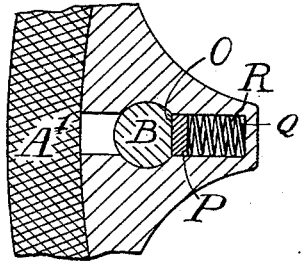

Figure 1 is a side elevation of the brake mechanism for a motor-car. Fig. 2 is a transverse section of the same, taken on line $xx$ of Fig. 1; and Fig. 3 is a section, to an enlarged scale, taken in a vertical plane of the middle of one of the brake-blocks.

A represents the brake-blocks, which are shown as adapted to act as what are known as "rim-brakes"—that is to say, to press against the inner peripheries of the wheel-rims. These blocks are shown as carried on the opposite ends of a transverse rod B and are mounted to be capable of turning thereon. The rod B is suspended by arms C D from a transverse spindle E, which is carried in brackets F, fixed to the side frames G of the car. The arm C is mounted to turn upon the spindle E; but the arm D is fixed thereto. The arm C has an upward extension C', forming an upward arm, and an arm H, which corresponds with the arm C', is fixed upon the spindle E and is alongside the arm C'. A rod J connects between the brake-handle K or otherwise with a motor by which the brakes are operated and the middle of a compensating lever L. One end of this lever is connected by a link M with the upper end of the arm C', and the other end of this lever is connected by means of a link M' with the upper end of the arm H. It will now be obvious that the pull of the rod J in putting on the brakes will, owing to its being transmitted through the compensating lever L, be divided equally between the two brakes and that consequently the brakes will press with equal, or substantially equal, pressure against their respective wheels.

In order to insure that the brake-blocks A, though capable of turning on the transverse rod B, will yet always be concentric with the wheels when in their off position, each portion of the rod B which passes through a brake-block has a flat face O, (see particularly Fig. 3,) formed upon its side which is farthest from the rim of the wheel, and a plate P is pressed thereagainst by means of a spring Q. The spring Q and plate P are contained in a recess R, formed in a backward extension of the brake-block. This recess may be conveniently formed by drilling a hole through from the front of the brake-block.

Should a brake-block turn slightly to adjust its bearing-face to the wheel-rim as it is pressed thereagainst, the plate P, which turns therewith, will be pressed back by the flat face O of the bar against the pressure of the spring Q, and the reacting pressure of the spring will turn the brake-block back again to its normal position as the block is moved back from the wheel. The brake-blocks may be faced with leather or rubber A' to form the bearing-surfaces against the wheel-rims.

Having fully described my invention, what I claim, and desire to secure by Letters Patent, is—

Brake mechanism for a motor-car, which comprises brake-blocks at opposite sides of the car, a transverse spindle carried in fixed bearings of the car, arms at opposite ends, respectively, of such spindle, which carry the brake-blocks, one of said arms being capable of turning upon the spindle and the other fixed thereto, two arms from such spindle, one forming an extension of the arm aforesaid which is capable of turning thereon and the other fixed to the spindle, a compensating lever pivoted at its center to a part which is moved by the brake-handle or motor to put on the brakes, and links connecting the opposite ends of this lever with the ends, respectively, of the second-mentioned arms of the spindle, all substantially as set forth.

In witness whereof I have hereunto signed my name, this 8th day of April, 1902, in the presence of two subscribing witnesses.

HERBERT AUSTIN.

Witnesses:
   ROBERT G. GROVES,
   THOMAS EDWIN CARLESS.